(12) United States Patent
Jacobs

(10) Patent No.: X6393
(45) Date of Patent: Feb. 22, 1831

(54) SAWING BOARDS

(76) Inventor: Ruel Jacobs

Kneel Jacobs of Wilton New York

Letters Patent

The Schedule referred to in these Letters Patent and making part of
the same containing a description in the words of the said Kneel
Jacobs himself of his improvement in the machine for sawing
Boards called the Economical Sawyer To all to whom these presents shall come - Kneel Jacobs of the
Town of Wilton, County of Saratoga and State of New York, sends
Greeting; Be it known that I the said Kneel Jacobs have
Invented, constructed and applied to use, new and useful im-
provements in the sawing of timber, which are contained in a ma-
chine called by me the economical Sawyer, and that the following
is a full and exact description of the construction and operation
of the said machine as invented and improved by me.

The objects proposed to be accomplished by the economical Sawyer
are to saw Boards and other timber without a stub shot and
to guage the thickness of the board or other thing into which the
saw log is to be sawn, and to keep the saw log plumb while
it is being sawed; Construct a common head Block of the size
in all respects required by the size of the carriage, with the usual
gain on the upper and inside surface; and the usual gain or kerf.
to receive the saw. When more than one saw is used at a time
in sawing it is necessary to have something to hold the inner
board up in its place, or the board which runs between the
saws, otherwise when it sawed off, it will drop in the saw
gain of the head block and between the saws, and thus hinder the
return of the carriage. To prevent this the following piece of ma-
chinery is necessary. Dig one oblong mortise six inches in length, two
inches wide, and two inches deep on the inside of the head block:
Bring one or other of the sides, next the saw gains and between
the upper and under side of the Block. Let the length of the mor-
tise be parallel with the upper surface of the head block. Cut of wire of the size of number six or eight make a coiled spring two
inches in diameter and six inches in length. Place the spring length
wise in the said mortise. Then take a piece of timber made the
length of one of the said insides of the head block about three inch
es wide, and about one inch and a quarter thick, call this the
slide or supporter. Let a piece of iron be wrought twelve inches in
length, a little less than two inches in width and about a quar-
ter of an inch in thickness. Let one end of it be turned up perpen
dicular to the length of the said piece of iron so that the end turn-
ed up shall make a hook two inches long - Then turn the other
end of the said piece of iron in the same direction and manner
so as to make a similar hook one inch long - Let this piece of
iron so turned at each end be fastened on one of the broadest sides
of the said slide or supporter parallel with the length thereof, and
in the middle of the breadth thereof and so that the said ends
turned up or hooks shall project at right angles from the length
of said slide, and so that the outside of the shortest hook shall ex
tend to, or be even with one end of the said slide.
Let the slide or supporter be placed on the said inside of the head
block in which the mortise was dug and the coiled spring placed
lengthwise and parallel with the said inside so that the hook of
the aforesaid piece of iron which is two inches long will pass into the
mortise at the end of it nearest the saw gain in the head block
and between it and the end of the spring therein. and so that the oth
er hook will extend to and be just even with the end of the head block
next to the side of the carriage. Let two cleats or slats be fastened
on the said inside of the head block parallel with the length thereof
and far enough apart from each other just to allow the said slide
or supporter to move backward and forward horizontally between them.
Let two or three staples fasten the said slide to the head block so it may
slide under them forward and backward between the cleats aforesaid
according as the said slide may be moved by means herein next af-
ter described - The said mortise must be so dug and the said cleets fastened at such a place as will bring the upper edge of the slide
or supporter about an inch below the log resting on the gain of the head
block. For the purpose of constructing the machinery to move the
said slide or supporter proceed as follows. at the end of the said inside
on which the said slide moves. that is nearest to the side of the car-
riage and at right angles with the length of the said inside, dig a
channel or gain about three inches deep and about three inches wide
and along the whole length of the said end of the head block. so
that the bottom of said channel shall be all the way perpendic-
ular with and at right angles to the said slide — Out of some hard
wood make a piece of timber about six inches longer than the length
of the said end or width of the head block. and of a breadth and
thickness easily to fit into the said channel or gain — at the dis-
tance of about nine inches from one end of this ~~said~~ last mentioned
piece of timber which may be called ~~the~~ lever. and on the side of
the depth or thickness thereof shave it equally and gradually to
to ~~the~~ point or end of the lever so as to make a regular slope and
so that the end of the lever shall be about a half an inch in thick-
ness. Make a piece of iron two inches wide about a quarter
of an inch thick and an inch and a half longer than the length
of the lever, fasten this lengthwise on the side of the lever opposite
the shaven or sloped side, in the middle of that side — and so that
one end of the said piece of iron shall project beyond the sharpened
end of the lever the distance of an inch and a half. let this be bent
at right angles towards the saw gain in the head block. and then
bent again at right angles to the widest side of the slide; so that the
piece projecting towards the slide shall be an inch in length. meas-
uring from the last bend or angle. this is intended to meet and
act upon the hook upon the end of the slide nearest the side of the
carriage. The lever must be fastened into the channel or gain in
the end of the head block by a pin put through a hole bored through
the sides of the gain or channel and through the lever parallel
with the end of the head block, and at a distance of about nine inches from the inside of the block piece and about an inch and a half from the end of the block piece. Then the result will be that the bolt in the end of the lever, being caught upon the hook upon the end of the slide; that whenever the lever is pressed into the channel made for it the slide will be drawn back from the saw gain so as to leave that gain free for the passage of the saw, and when the lever is not pressed in; the slide will be under the saw log so as to catch and hold up the board when sawed off.

To push in the lever whenever the saw enters the saw gain, let an arm made of wood be fastened upon the fender post of the saw mill that shall first touch the lever and press it in, whenever the block piece touches it, and which of course will cease to operate when the head block of the carriage has passed it, and which of course will leave the slide always under the saw log to hold up the boards or whatever may be sawed, and will withdraw the slide whenever the saw enters the saw gain. To construct the gauge and plumb necessary for fixing the thickness of the board and keeping the saw log plumb. At a point in the upper surface of the head block half way between the saw gain and the end of the head block, and at a distance of about two inches from the gain for the saw log, fasten perpendicularly and firmly a post about eight inches high six inches wide and four inches thick so that the broadest side shall be parallel with the length of the head block. Through the two broadest sides of the post and in the middle thereof and commencing at the surface of the head block, dig a mortise three inches high and two inches wide so that the bottom of the mortise shall be level with the surface of the head block and the upper side of the mortise three inches above the said surface. Make a wooden bolt or key about eighteen inches long, of a size to fit the mortise in the upright post tapering a little from one end to the other so as easily to go in said mortise and snugly to fit after it is in. This key or bolt is for the purpose of fastening the plumb or gauge on the required position. The plumb or guage is constructed as follows.
Take a hard piece of timber two feet long, ten inches wide and four
inches thick. At the distance of ten inches from one end saw
through the width of the said piece of timber perpendicularly to
within three inches of the opposite edge or side, then leave the piece
which is ten inches in width and length and cut down the other
the whole of its length as low down as the saw cut. you will then
have what may be called the plumb or guage and one part of
it will be three feet two inches long, three inches deep and four
inches wide with its upper surface smooth and parallel with its
under surface. The other part of it will be of course ten inches
square. let the under corner of this square piece be cut off so as
to prevent the saw dust from clogging the plumb. For the pur
pose of having a convenient place to put the boards &c when sawed
erect and fasten a small post on the upper side of the gage
near the small end and of a height equal to the upper surface
or edge of the square or large end of the plumb. On the said upper
edge of the square end and on the top of this post fasten a small
bar or rail of convenient size and length. On this the sawed
boards may be thrown while the sawyer is sawing, until he
can have time to remove them to other proper place.
The guage or plumb is to be fastened on the gain of the head block
which the saw log rests upon and parallel with the length of
the head block and is fastened to any desired point by passing
the key or bolt through the mortise in the upright post standing
on the head block and over the plank. By means of this
boards or other stuff may be sawed of any desired thickness
For the purposes of constructing dogs to hold the saw log in
its position proceed as follows. Take a block of hard timber
one foot and a half long and four inches square. On one side
thereof and parallel with the length thereof fasten firmly a cast
iron plate of equal length thereto, one inch in thickness and
six inches in width and let the ends of the plate be even with the ends of the block of wood respectively. Make a cast iron slide
about eight inches long and about three inches thick and about
eight inches wide. Un one of the wide sides of this let a groove or
channel be cast. on which the plate on the top of a wooden block
may be inserted so that the slide or dog may move thereupon
and the channel or groove must be so cast as to touch and hug
the cast iron plate on the underside of the edges of it which ex-
tend over and beyond the sides of the wooden block so that
the slide or dog may move easily backwards and forwards, but
not otherwise. Through this cast iron slide or dog let four or five
holes be cast, and through the width thereof for the purpose
of inserting wrought iron dails which may be drawn through
them into the log to keep it fast and may be easily taken out
with an iron crow bar or mill bar. These dails or spurs should
be about an inch and a quarter square and about one foot
in length. If it should be deemed necessary for the further
security and steadiness of the log. two additional spurs of sim-
ilar size may be put through holes, made and secured by iron
casings or otherwise in the block of wood, on the iron plate of
which the cast iron slide or dogs move. These should be put
as near that end of the block of wood which comes nearest
to the saw as their firmness and the strength of the wood will
allow and one directly above the other. This block of wood and
its castings complete the dog or slide, and must be fastened on
the upper side of the head block and on that side of the saw which
is opposite the one on which the plumb or gauge is ^placed^ fastened
lengthwise thereon and parallel with the length thereof so that the
side of the dog shall be in the same plane or surface with the
upright or perpendicular side of the saw by gain, and one end
of it must just touch the nearest side of the saw gain.
Let this end be the one in which the additional spurs or dails are
inserted. The under edge of the inside of the slide or dog should
be cast with small cogs so as to fit a small cast iron wheel

United States Patent

Patent No.: X6393 to be placed below it, with a [illegible] to be inserted thro' the block of wood, for the purpose of turning the slide or dog backwards or forwards as occasion may require - and the under edge of the other or outer side of the dog is to be notched to receive a catch or hand to be fastened to the said block of wood to keep the slide or dog from going back or moving when set.

Another kind of plumb or guage may be made in lieu of the one heretofore described, by fixing a slide in the same manner as last described, except the spring on the same side where the other spring was placed by fastening a small iron plate about six inches long, four inches wide and an inch thick on to the inside of the guage, and at that end of it which is next the saw gain and perpendicular to the inside of the slide - the length of this small plate is to be up and down. The wooden block on which the slide moves to be placed in the same position as the dog only on the opposite side of the saw gain. This slide may be made to move so as to direct the thickness of the stuff to be sawed at will. The whole head block is intended to be moveable at pleasure, [illegible] calculated and provide against the difference in length of the timber sawed. For this purpose a couple or more of strong iron hooks are fastened firmly to each end of the head block to hang down and catch in a cleet to be fastened on each out side of the carriage at such places therein as may put the head block in a proper position as required by the length of the timber to be sawed. A foot block similar to the head having a saw gain to allow the saw to saw through the log, and having upon it all of the machinery herein above described, except the spring, slide and lever and hooks, is to fasten firmly upon the foot or other end of the carriage. The machinery is then complete for sawing boards and other stuff without slab shots - for guaging the thickness of the stuff intended to be sawed, and for keeping the log plumb, and for fastening the log in its proper place. The machinery for these several purposes may be used separately or together
as may be thought best, as either may be used without the other,
and the improvements for each purpose as herein above set forth
the said Reuel Jacobs claims as his — In witness whereof
he hath hereunto set his hand and seal this 11th day of Sept
ember in the year of our Lord One thousand Eight hundred
and thirty Exd. Witnesses
[illegible] Oran G Otis
Thomas Palmer Reuel Jacobs.

(3068 Words)